Aug. 9, 1955   E. R. FREDERICK   2,715,086
SIMULATED DOWN FILLER AND METHOD OF MAKING THE SAME
Filed March 17, 1952   7 Sheets-Sheet 1
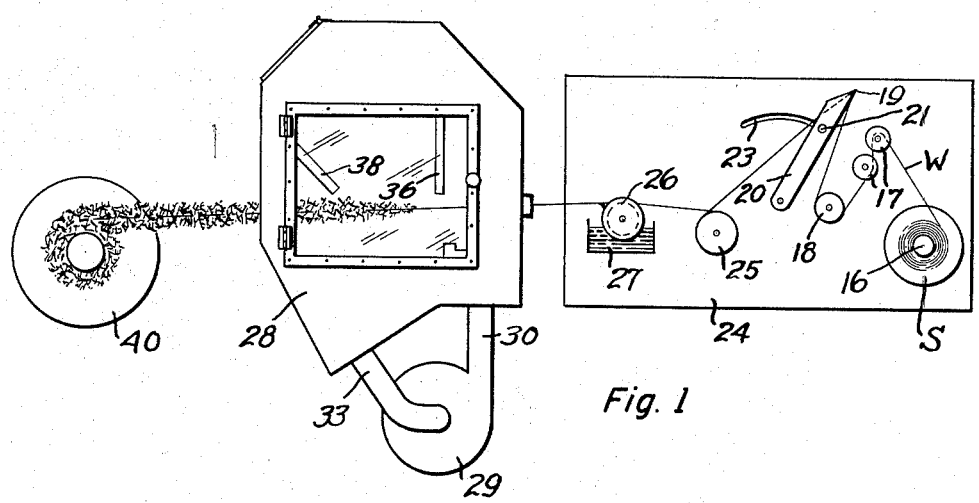
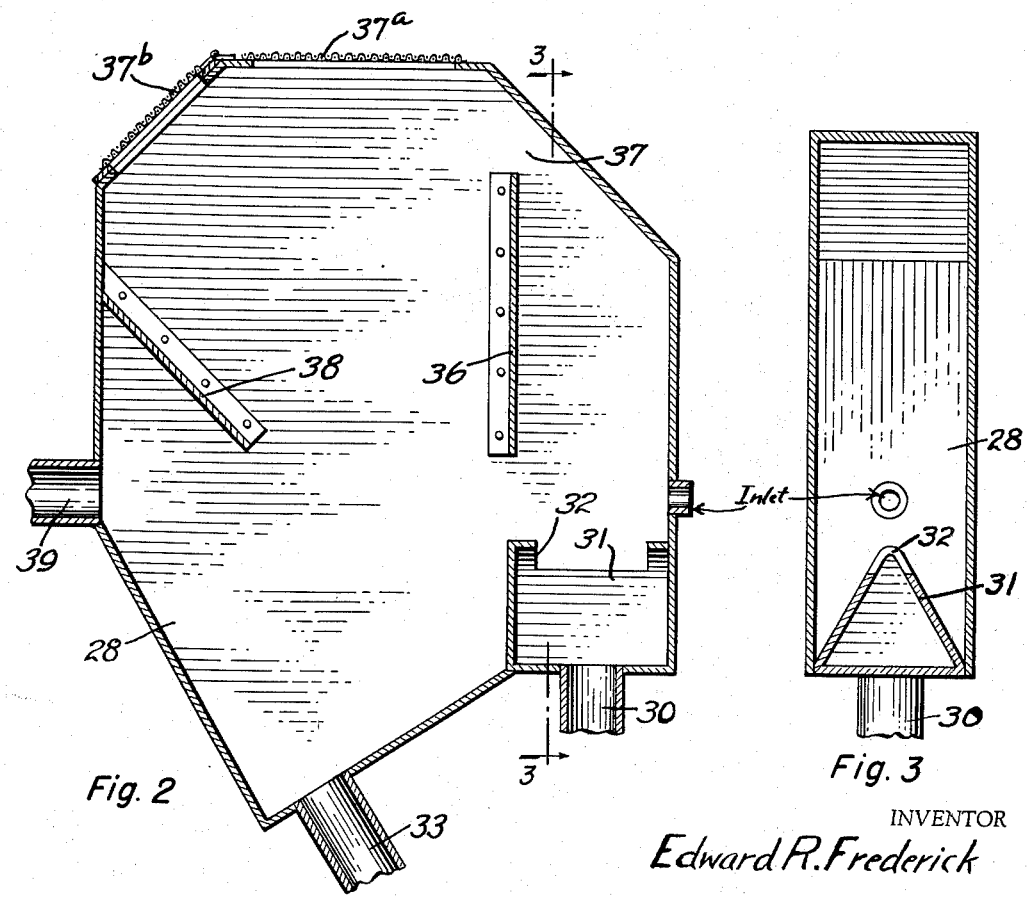
INVENTOR
Edward R. Frederick
BY
W. J. Eccleston
ATTORNEY Aug. 9, 1955     E. R. FREDERICK     2,715,086
SIMULATED DOWN FILLER AND METHOD OF MAKING THE SAME
Filed March 17, 1952     7 Sheets-Sheet 7

INVENTOR
Edward R. Frederick
BY
ATTORNEY

United States Patent Office 2,715,086
Patented Aug. 9, 1955

2,715,086

SIMULATED DOWN FILLER AND METHOD OF MAKING THE SAME

Edward R. Frederick, Pittsburgh, Pa., assignor to the United States of America as represented by the Secretary of the Army Application March 17, 1952, Serial No. 276,985

30 Claims. (Cl. 154—44)

This invention relates to fillers for sleeping bags, pillows, comforters and the like and to methods of making the same, and in general aims to provide a filler "whose filling" power will approach or equal that of waterfowl feathers and down, while having other properties making it superior as a filler to such feathers and down.

In explanation of the term "filling power," reference may be made to the report entitled "A Proposed Method for Measuring the Filling Power of Down and Feathers" by Henry A. Sinski, publication No. TD 103037, The Office of Technical Services, U. S. Department of Commerce, and to the article by N. B. Edelman in Textile Research Journal, vol. 17, p. 199 (1947), entitled "Investigation of methods for determining the filling power of feathers."

Another object is to provide a filler which is of extremely low density with a high bulk-to-weight ratio. Another object is to provide a filler having exceptional softness and drape properties, so that the article employing the filler is comfortable to the user. Another object is to provide a filler which may be manufactured by automatic machinery at fairly high speed. A further object is to provide a filler which may withstand the somewhat destructive effects of washing or dry cleaning. A further object is to provide a filler made of inexpensive materials which are available in almost unlimited quantity, so that the filler may be practicable for large scale use by the Army and the public. An additional object is to provide a filler which will not pack or form permanent dense layers under pressure from the human body, yet will permit temporary collapsing or reduction of its volume for packaging or shipping. A further object is to provide a filler which has the inherent ability to restore itself to its original high bulk form after being subjected to prolonged or recurrent compressive stresses. A still further object is to provide a filler which will withstand temperatures as high as 120° F. and as low as −65° F. without significant deterioration.

One of the specific objects is to provide a fabric tube containing one or more of the helical feather-covered elements of the invention and forming a filler element which, when assembled with other like elements and sewed to a textile sheet, will form an insulating layer for sleeping bags and the like.

Articles such as sleeping bags, made by known methods employing first quality waterfowl down, when used in the field frequently develop areas which lack a down layer, and these areas may cause acute discomfort or even frostbite in very cold weather. Use of a continuous helical core, or a multiplicity of such cores, coated with feathers in accordance with the invention, makes it possible to manufacture sleeping bags characterized by filler layers which are unbroken even after extensive use of the sleeping bags.

The invention contemplates the use of commercial so-called "curled" chicken feathers, which are actually crushed feathers washed with a detergent. Such feathers normally show no electrostatic charge, but after attachment to a helical core member in accordance with the invention they show an appreciable charge, particularly after aging. This is of importance because the ability to acquire an electrostatic charge makes possible fluffing a pillow, etc., containing fillers of the invention.

Another important advantage of the method is that the filler elements may be varied by changing the filament diameter, also the helix pitch and diameter, so that an assembly of a number of the filler elements may be provided having several times more resistance to crushing (compression) at certain points than at others, so that the unevenly imposed weight of the human body on the sleeping bag filler is sustained by filler areas or zones having exceptionally large resistance to lateral compression, whereby no excessive flattening of the filler layer can take place with consequent minimizing of its insulating power.

The invention also materially enhances the filling power of the filler elements and insulating layers or masses of the invention by solvent extraction of ingredients believed to be the natural oils or waxes which remain in chicken feathers even after being washed with detergents. These natural oils or waxes tend to make the feathers pack, and decrease their filling power by 30% or more.

Further pursuant to the invention the washed and preferably solvent-treated feathers, before or after being affixed to the cores, are sprayed or coated with a wax, a resin or an elastomer, with surprising increases in filling power.

Also in accordance with the invention, feathers treated to remove their quills and forming so-called "feather fibers" are attached to the core elements by an adhesive, preferably after being coated with a wax, a resin or an elastomer.

Products of the invention may be packaged after collapsing or flattening the helices; when the pressure is removed, the helices quickly assume their original form (assuming that no permanent set due to heat and pressure has been imposed). The collapsed or flattened helices form soft flexible bulky layers or masses of light weight and high insulating value, and such layers may be used for inner linings of coats, for example.

The invention further aims to provide a filler having an insulation value of approximately 8 clo in a sleeping bag of normal or standard filled density (where 1 clo is the amount of insulation necessary to maintain comfort and a mean skin temperature of 92° F. in a room at 70° F., with air movement of not over 10 ft. per minute, humidity not over 50%, with a metabolism of 50 calories per square meter per hour). On the assumption that 76% of body heat is lost through the clothing, a clo may be defined in physical terms as the amount of insulation that will allow the passage of 1 calorie per square meter per hour with a temperature gradient of 0.18 C. between the two surfaces; or expressing the relationship in equation form—

$$1\ clo = \frac{0.18°\ C. \times hr. \times m.^2}{Cal.}$$

$$= \frac{0.88°\ F. \times hr. \times ft.^2}{B.\ t.\ u.}$$

where 1 cal.=397 B. t. u.=1000 calories=1.1116 watt hours. See Gagge, A. P., Burton, A. C., and Bazett, H. C., in Science, 94:428 (1941).

In the accompanying drawings forming a part of this specification and showing diagrammatically two different forms of apparatus for practicing the method of the invention, also some products of the method, Fig. 1 is a front elevation of one form of the apparatus;

Fig. 2 is an elevation on a larger scale of the feather-applying chamber shown with the front wall removed;

Fig. 3 is a section on line 3—3 of Fig. 2;

Figure 4:
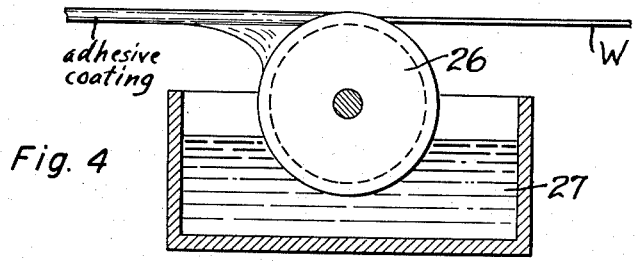
Fig. 4 is a sectional elevation of the adhesive bath.

Before proceeding with a description of the methods of making the filler, it should be explained that a careful study of the problem and available raw materials led to the conclusion that the filler should be of indefinite length so that it could be cut to the desired length, that it should employ feathers cemented to a helical wire or monofilament, and that the helix itself should be open and of relatively large dimensions. Because chicken feathers are available in huge quantities, are inexpensive and non-strategic, they are preferred to all other raw materials. However, turkey feathers (which preferably are treated to remove their quills), straight or crushed bird feathers, quill-less bird feathers, waterfowl down, rabbit hair, other animal hair or wool, chopped synthetic fibers or yarn, such as chopped nylon monofilament, and even mixtures of feathers or feather fibers with natural or synthetic fibers, may be used. The following wires or monofilaments have made satisfactory products: steel wire (piano wire) 000, 00, 0, 1, 2 and 3 gauge; nylon, 0.005, 0.006, 0.007, 0.008, 0.010, 0.015 and 0.020 in. diameter; fiber V or "Dacron": 0.009 in. diameter; polyvinyl chloride: 0.010 and 0.020 in. diameter; polyethylene: 0.020 in. diameter; "Saran" (Dow): 0.010, 0.015 and 0.020 in. diameter. "Saran" is a trade name for polyvinylidene chloride plastics, while "Dacron" is a trade name for polyethylene terephthalate. For convenience, the term "wire" is sometimes used herein to denote any suitably fine metallic wire or resinous monofilament having the necessary resiliency.

Referring first to Figs. 1 and 2 of the drawings, a spool S is shown supported on a spindle 16 so as to rotate freely and pay out a monofilament or wire W wound thereon. A friction device 17 of known construction grips the wire W frictionally, and as the end of the wire is being pulled by a reel to be described, the wire will be under constant tension. An idler pulley 18 guides the wire to a fixed knife edge 19 mounted on the upper end of a pivoted upwardly extending arm 20, whose angle may be adjusted by means of a bolt 21 which passes through an arcuate slot 23 in support 24. As the tensioned wire passes at an acute angle over the knife edge, one side of the wire is stretched, which results in a permanent set causing the wire to assume a permanent helical form, when the tension is relaxed. For nylon monofilaments and the like, the described knife edge may be replaced by an electrically heated, thermostatically controlled curling edge, such as a soldering iron modified at its tip to provide a heated knife edge (not shown). In certain of the claims, for convenience, this step of imparting an inherent helical form to the wire is termed "spiralizing" and the wire or monofilament is called "spiralized wire." When working with nylon and similar monofilaments, it is advantageous to set the helices with heat and/or humidity control. The desired high humidity may be attained by a fine water spray or a moistened wick (not shown) which the monofilament contacts before it passes over the knife or curling edge.

From the knife or curling edge the wire goes to a power-driven roll 25 about which it is wrapped once, to effect drawing of the wire; then it passes to an adhesive-coating roll 26 dipping into an adhesive bath 27. See Fig. 4. For the adhesive I prefer to employ "Pliobond 20," which is understood to be a butadiene-acrylonitrile rubber type adhesive, made by the Goodyear Tire & Rubber Company. This adhesive forms a positive bond so strong that chicken feathers attached to the core by the adhesive may be pulled apart before their bonds will yield. "Pliobond 20" is extremely tacky, is vulcanizable, dries satisfactorily under the conditions obtaining, and is not brittle at low temperatures (−65° F.), nor does it disintegrate or flow at +120° F. Also it forms a protective coating for steel wire, minimizing rusting. While the adhesive has an objectionable odor, perhaps due to a volatile ketone, the odor disappears in time; if desired, deodorants or aeration may be used to shorten the period during which the odor is noticeable.

After passing around roll 26, the adhesive-coated wire or filament extends in a horizontal line, due to its tension, and passes through a feather-applying chamber 28 to which a blower 29 (driven by a direct-connected electric motor, not shown) is coupled through a blower line or tube 30 discharging into the bottom of the chamber. A fixed nozzle 31 having a narrow elongated discharge opening 32 extends from the bottom of the chamber upwardly nearly to the horizontal wire or filament to direct the blast of air against it. Air is supplied to blower 29 principally from an exhaust or suction line 33 which sucks air and feathers out of the bottom of chamber 28. Feathers are supplied from a feed conveyor which may be connected with a hopper, not shown, or if preferred, the feathers may be blown into the chamber, with suitable precautions to prevent interference with the air-borne feathers inside the chamber.

The stream of air from the blower 29 not only carries the feathers upwardly but orientates them, the quills of nearly all the feathers traveling through tube 30 being foremost or in advance of the barbs. Thus, it is usually the quills which strike the wire and become attached thereto by the adhesive. When so attached the quills are generally at right angles to the wire. The air stream helps to dry the adhesive to make a reasonably firm bond between the feathers and the wire before the wire passes out of the machine. Those feathers which do not become attached are blown upwardly to the top of the chamber, being confined in a definite stream of air by an upper vertical partition 36 which extends nearly to the top of the chamber but provides an opening 37 for the air stream and unattached feathers to flow through, the movement being counterclockwise as the parts are viewed in Fig. 1. This counterclockwise flow is aided by the illustrated angular arrangement of the top walls of the chamber and, if preferred, a rounded top wall may be employed to make the flow more smooth. A baffle 38 fixed to the end wall of the chamber and extending downwardly at an angle of about 45° to the horizontal diverts the unattached feathers moving down from the top of the chamber away from the discharge opening 39 and causes the unattached feathers, in many cases, to strike the portions of the coated wire not covered by feathers, thereby to complete the covering of the wire before the wire emerges from the chamber. The top walls of the chamber may have screens 37a, 37b permitting escape of air blown into the chamber, which prevents loss of feathers through the discharge opening 39. Those feathers which are still unattached after going past the wire a second time are returned to the blower by suction line 33 and are again blown into the chamber past the wire, and continue in this course indefinitely until they are finally adherent to the wire. The covered wire, still straight due to its tension, travels to a take-up reel 40, to which one end of the wire was initially attached so that it could be wound up. If desired, reel 40 may be of such diameter that a single rotation thereof will be sufficient to make a single filler element; in this case, after each reel rotation, the drive motors may be stopped by a simple limit switch (not shown) which could be controlled by a cam on reel 40, and the filler element may then be cut and removed from the reel for further processing, or else the filler element may be cut while the reel is still in rotation, provided the reel has appropriate means for gripping the severed end of the filler element. Power to rotate roll 25 is derived from any convenient source, such as a small electric motor (not shown), driving a reduction gear and a sprocket gear and chain (not shown). Similar drives (not shown) may rotate the adhesive-coating roll 26 and the take-up reel 40. Control of the motors may be by means of hand switches (not shown) mounted on the support 24. The several drives are not illustrated because the apparatus is fully disclosed in my application Serial No. 304,875, filed August 18, 1952.

Figure 6:
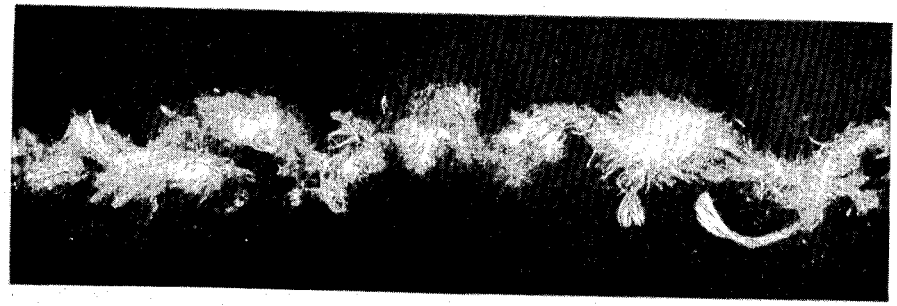
Fig. 6 is an elevation of a filler element made by the apparatus of Figs. 1 and 2.

Fig. 6 shows a feather-covered filament after it has been removed from the described apparatus. The individual feathers were nearly all attached by their quills to the spiral core, and extended outwardly therefrom in all directions. The spiral core was a nylon monofilament of 0.020 in. diameter, weighing 0.01335 oz. per linear foot, when tensioned. A sample of this feather-covered product when permitted to assume its untensioned spiral form weighed between 1.5 and 1.6 gm. per foot. Naturally the weight will vary according to the core material and the fibers covering the same.

Although the monofilament of Fig. 6 when "spiralized" upon relaxation of tension might have assumed a helix diameter of about one inch and a pitch of about one inch, the powerful adhesive used, plus the tension imposed by the described apparatus, act to extend or stretch the helix permanently, so that it has a smaller diameter and a greater pitch than it would have were the tension relaxed immediately after the spiralizing step. In one instance observed, a nylon monofilament 27 in. long after coating with the described adhesive formed a helix of about ⅞ in. diameter with a pitch of at least 2½ in. If such stretching or distortion is more than be tolerated, the apparatus shown in Fig. 5 may be used to form the helix; or the original helical form (1 in. pitch, 1 in. diameter) may be substantially restored by axial compression of the stretched helix combined with heat treatment (assuming that the monofilament is a heat-deformable or thermoplastic material like nylon or "Dacron").

Careful examination and analysis of the products of four runs of the described machine showed the following results:

TABLE I

| Filament Type | Nylon | Nylon | Nylon | "Dacron" |
| --- | --- | --- | --- | --- |
| Filament Size (diam. in inches) | 0.020 | 0.015 | 0.010 | 0.009 |
| Percent Weight of Filament | 17.6 | 14.3 | 6.2 | 8.1 |
| Percent Weight of Adhesive | 6.6 | 9.6 | 5.5 | 3.9 |
| Percent Weight of Crushed Chicken Feathers | 75.8 | 76.1 | 88.3 | 88.0 |
| Weight of Covered Tensioned Filament (gm./ft.) | 0.379 | 0.264 | 0.288 | 0.276 |

Figure 5:
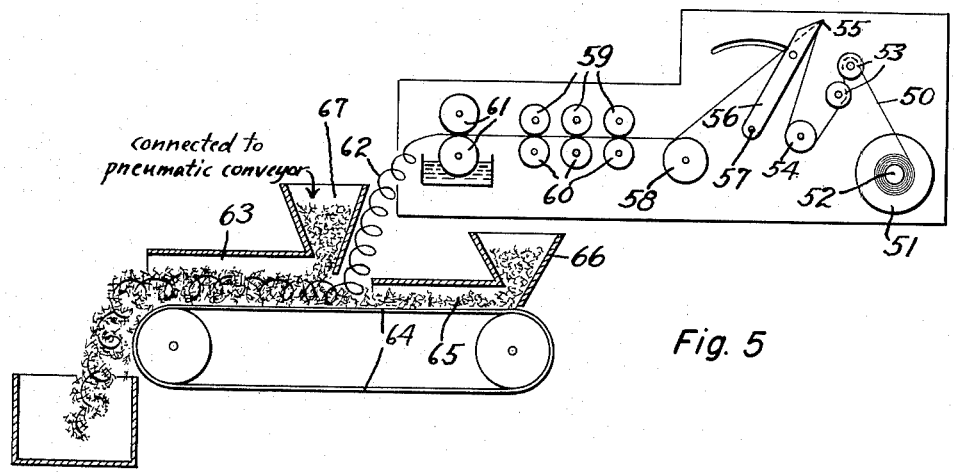
Fig. 5 is a diagrammatic elevation of another form of apparatus for affixing feathers to a relaxed or untensioned core member.

Referring to Fig. 5, a form of apparatus is there shown which will minimize deformation or stretching of the helix. Here the monofilament 50 is unwound from a spool 51 supported to rotate freely about a fixed pin 52; the monofilament passes through a frictional tension device 53, then around a grooved pulley 54, then up over a knife edge 55 fixed on the upper end of a pivoted and adjustable arm 56 whose pivot is indicated at 57.

The tensioned monofilament then runs down around a driving pulley 58 and between three pairs of driving rolls 59, 60, then between the power-driven adhesive-coating rolls 61. Immediately after leaving the coating rolls, the monofilament, which has been "spiralized" by contact with the knife edge, has its tension relaxed so that it assumes a generally helical form, as indicated at 62. The core, as it leaves the adhesive rolls, is at first an extended or stretched helix but assumes its final helical form gradually as the molecular stresses in the monofilament are given time to react. The helical core then enters a chamber 63, into which a horizontal belt conveyor 64 runs. The upper run of the belt conveyor receives continuously a supply of feathers 65 by gravity from a hopper 66 or from a pneumatic conveyor (not shown) whose delivery end may be greatly enlarged to deposit the feathers gently on the upper run of the conveyor, which may be foraminous (not shown) to permit the air to pass through it while leaving the feathers behind. As the coated helical core enters chamber 63, it falls down on top of the layer of feathers 65 and immediately many of the feathers attach themselves at various angles to the loops of the helix on the outside, some extending longitudinally of the helix on the outside to form bridging elements attached to and extending between two adjacent loops. Additional feathers are blown into the top of the chamber through a pneumatic conveyor having a discharge end 67 to insure attachment of some feathers inside the helix, as well as at all points on the outside. An exhaust pipe (not shown) may be coupled to the chamber 63 at the delivery end to carry away by suction any loose feathers, which may be again introduced into the apparatus; and, if necessary, an air jet (not shown) may be used to blow off unattached feathers remaining on the upper run of the conveyor so that they will be caught up by the suction and carried away; or an electrostatic field may aid in dislodging the feathers from the conveyor.

If desired, different types of feathers may be simultaneously applied to the helical core by the apparatus described above and partially shown in Fig. 5. For example, straight feathers, which are stronger than crushed feathers, may be discharged on the conveyor to form a layer 65, while crushed feathers and/or feather fibers may be introduced into the chamber through conveyor outlet 67. The straight feathers lying on the conveyor will become attached almost wholly to the outside of the helix and in many instances will extend longitudinally of the helix, adhering to two adjacent coils thereof; while the crushed feathers and/or feather fibers will be attached both inside and outside the helix. The described form of filler element employing straight feathers has exceptional resistance to compression stresses primarily because the straight feathers form bridging elements tying together adjacent coils. However, because of this resistance it will lack the softness and draping quality of the filler element made by the method of Fig. 1.

As the wire before coating may be wound on a large spool and have a total length of hundreds or even thousands of feet, the final product may be of any length desired. A single length of feather-covered helix or several lengths laid side by side may be inclosed in a woven textile tube, and a series of such tubes may be laid side by side and stitched to the walls of a sleeping bag to extend longitudinally thereof, or may be sewed on a fabric layer to form an insulating layer useful in certain types of clothing, in comforters, etc. Obviously, a plurality of layers of the covered helices inclosed in fabric tubes or otherwise anchored against shifting may be employed to give body or bulk to a pillow.

Figure 7:
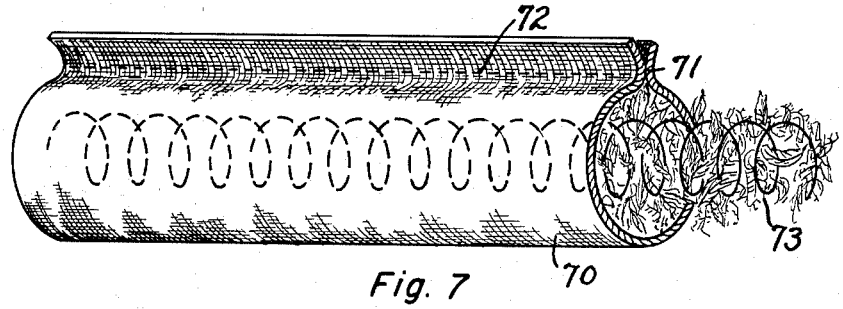
Fig. 7 is a diagrammatic perspective view of a tubular filler element useful for making various articles.
Figure 8:
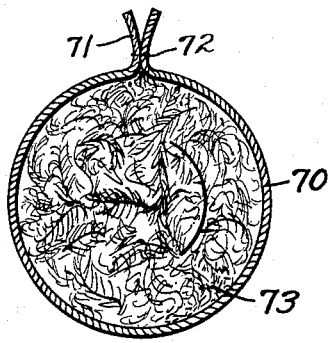
Fig. 8 is a cross section through the filler element of Fig. 7.
Figure 9:
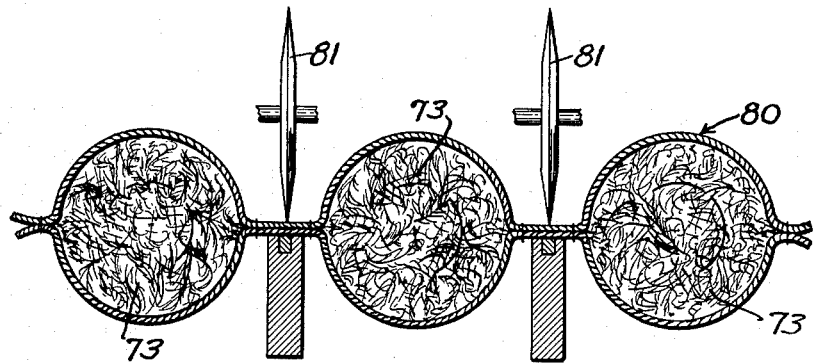
Fig. 9 is a cross section through a textile fabric composed of a number of filler elements similar to that of Fig. 6, showing also the use of rotary knives to sever the fabric structure into a plurality of separated filler elements.
Figure 10:
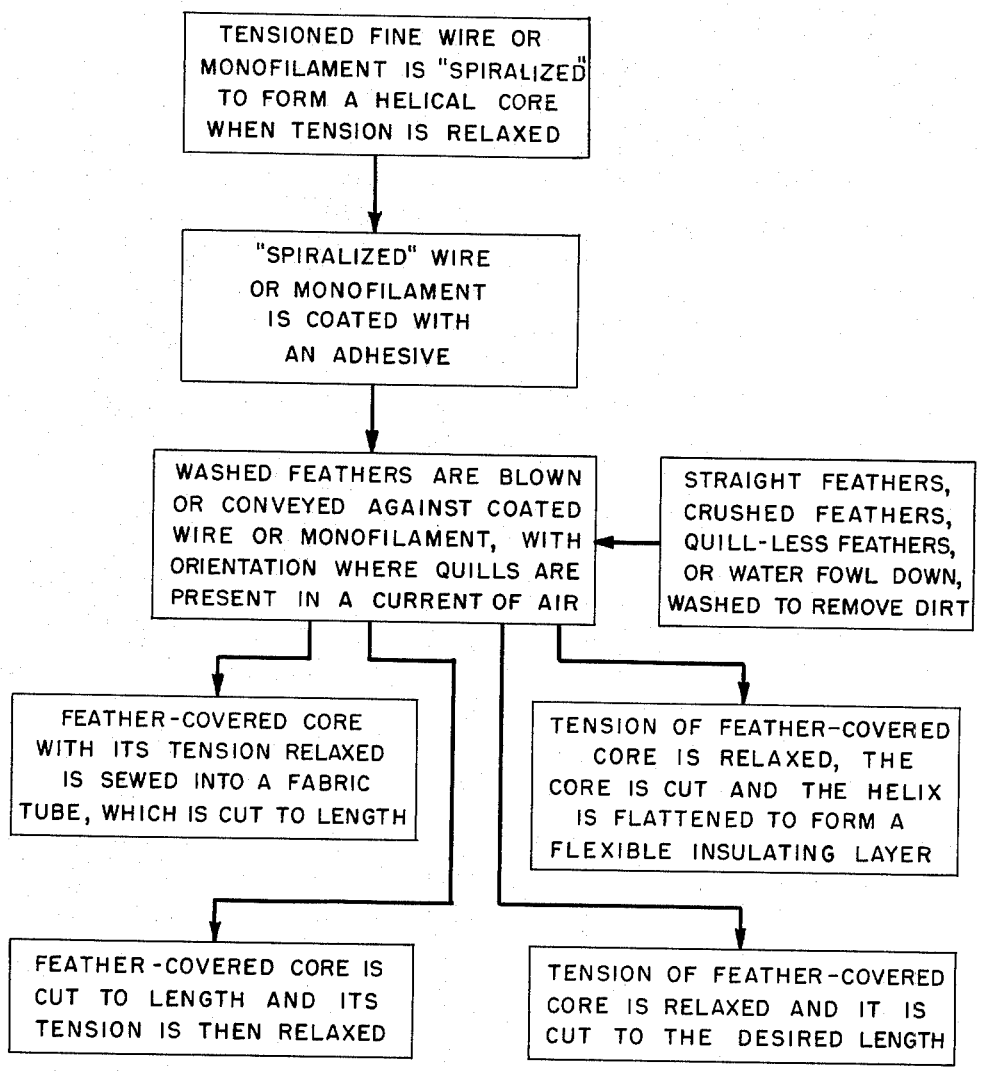
Figs. 10, 11 and 12 are schematic diagrams or flow sheets summarizing three different procedures within the scope of the invention.
Figure 11:
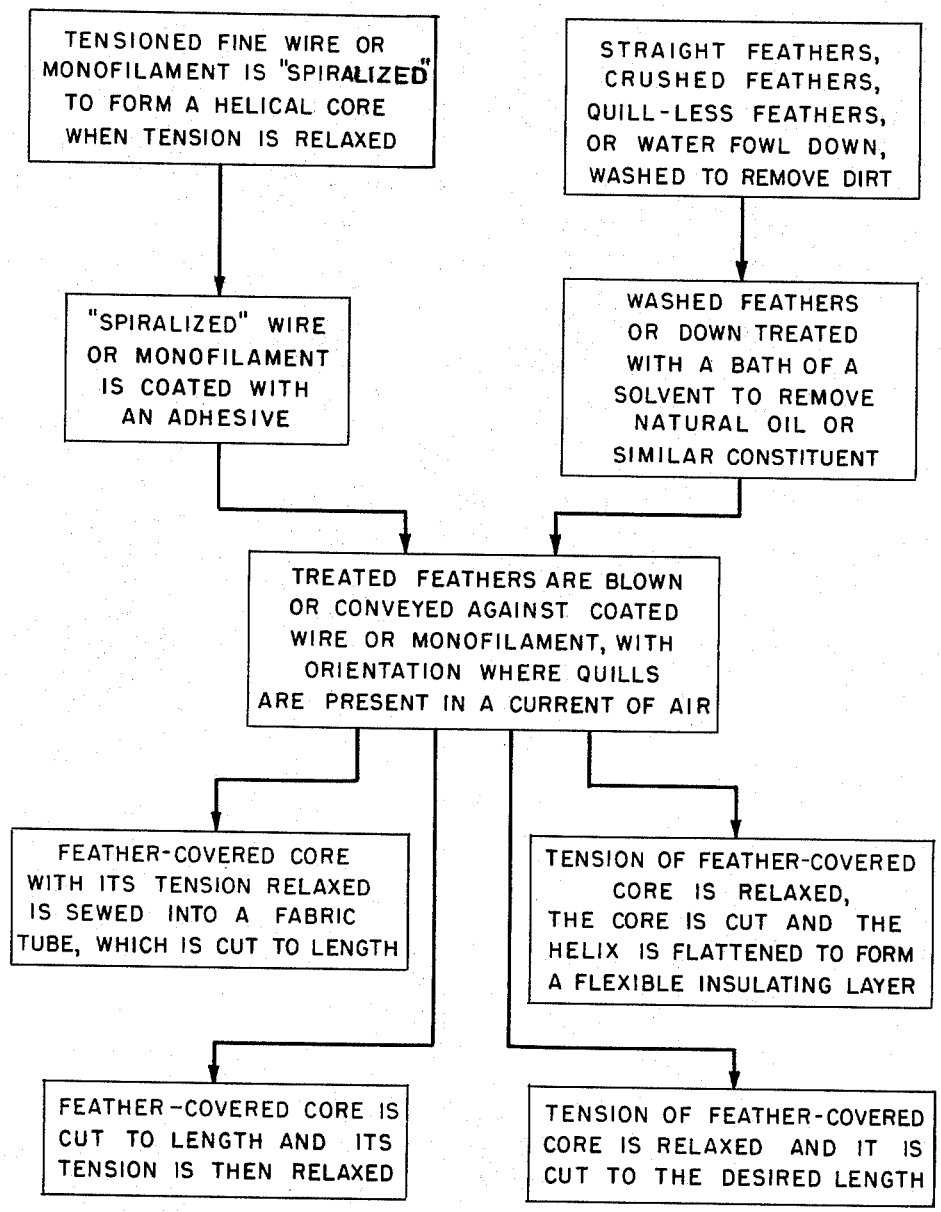
Figure 12:
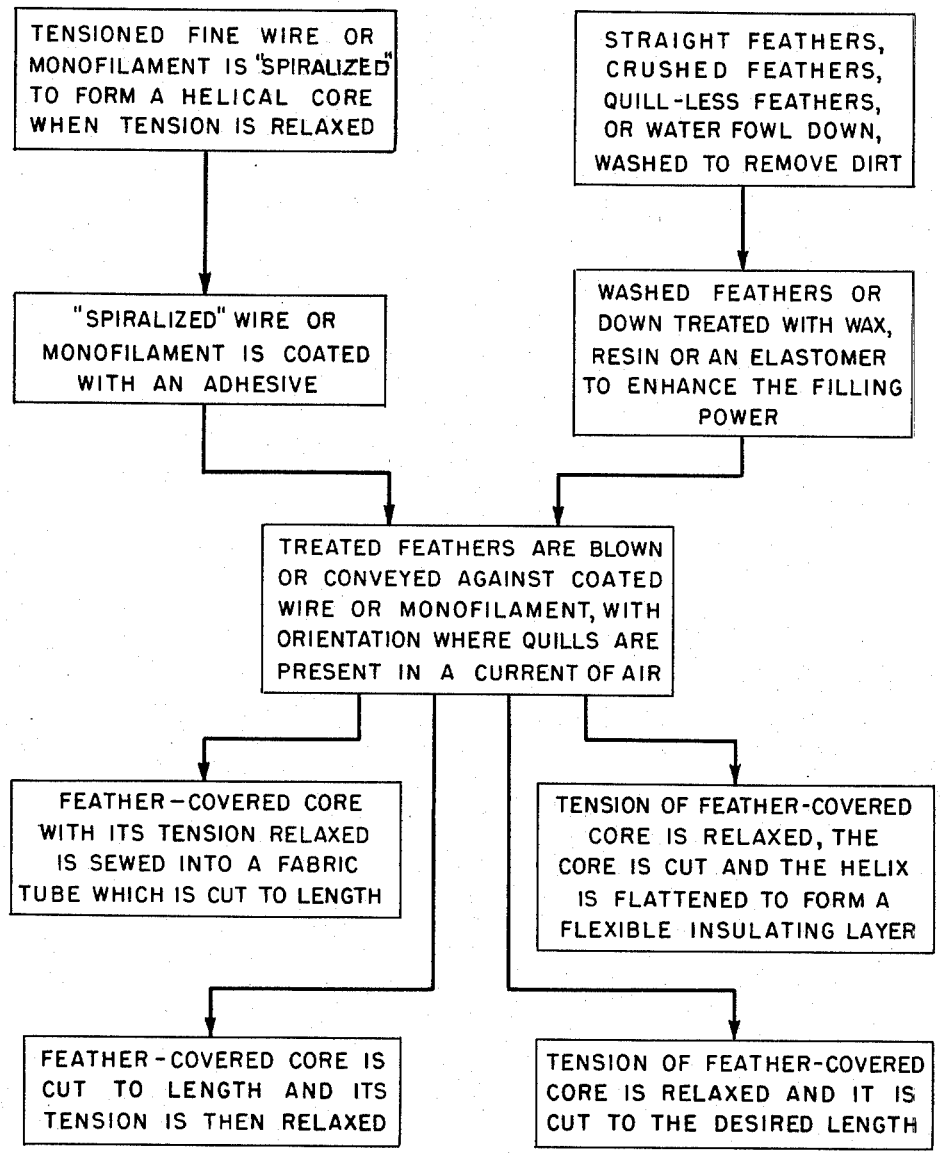

Referring to Figs. 7 and 8, a fabric tube 70 has a seam 71 formed by stitching 72 and incloses a single feather-covered helix 73. Some of the feather ends will extend into the seam 71 to be caught by the stitching 72, thereby locking the helix against longitudinal shifting within the tube, which will be most desirable. The fabric tube 70 with its filling 73 forms a "filling element" which may be made very rapidly by automatic machinery. Two or more of such elements may be made simultaneously to form a fabric structure 80, Fig. 9, and rotating knives 81 or other severing means may separate the elements for individual use if desired; however, when manufacturing sleeping bags, the fabric structure 80 (which may be as wide as desired) may be used without severing the elements, thereby saving labor and time. In other words, the fabric structure 80 may have a width equal to the circumference or perimeter of a sleeping bag and may be used as an inner layer of such a bag or as an intermediate layer, which would require only one seam. The construction would be advantageous in making sleeping bags improving the construction specified in Military Specification MIL–B–10721 (QMC) dated November 22, 1950, as the filler elements cannot bunch or pack, are much cheaper than waterfowl down, and lend themselves to far simpler and faster manufacturing procedures.

In lieu of the described sleeping bag construction, one or more continuous feather-covered helices may be used, running spirally around within the fabric walls and held by stitching or otherwise against shifting relative to said walls. The unlimited length of the filler elements made by the inventive method makes the manufacture of this form of bag a very simple operation, capable of being formed by automatic machinery. Claims to sleeping bag constructions are not presented herein because they are not considered to be part of this invention.

For a pillow, a plurality of the described filler elements may be laid side by side or sewed side by side to a fabric sheet to form a layer, and a similar layer may be placed on top of the first layer but with its filler elements at right angles to those of the first layer and a third similar layer may be placed on top of the second layer with its tube elements at right angles to those of the second layer, and so on. Each filler element may contain one or more of the feather-covered helices. Stitched covering fabric will, of course, hold the assembled layers together. The described pillow construction is considered to be outside the scope of the present invention.

Filler elements of the invention also will form a soft and efficient insulating layer if the feather-covered helix is simply flattened by moderate pressure and assembled with other like helices to make a compact layer of anchored feathers. No ink drawing can show the construction: in appearance, the layer looks like a flattened mass of feathers. Obviously, the practically unlimited length of the covered helix makes it possible to measure the layer prior to flattening the helix or helices; in other words, an insulating layer is readily made of a predetermined weight or length for any particular garment. An insulating layer made from flattened helices would be particularly desirable as an interlayer or liner for outer coats and other warm garments; it would be less expensive than most linings now in use, would be lighter in weight, warmer, and would conserve strategic materials. In spite of the considerable length of a flattened helix in such a layer, the product feels soft and drapes satisfactorily and will not cause discomfort. The same flattened helical masses in smaller volume could be used to give body or bulk to certain parts of garments superseding horsehair, felt, or other fibrous padding materials heretofore used. The flattened helical masses are, moreover, expansible in the direction of their thickness because the flattened helical core or cores always tend to resume their inherent helical forms. This tendency to expand in the direction of the thickness may be termed "breathing"; it arises from the property of certain plastics known as "memory."

The dimensions of the helices, that is, their diameters and pitch, are subject to variation by changing (1) the tension of the wire or monofilament where it passes over the knife edge or curling edge, and (2) the angle of the approaching wire relative to the edge. Greater tension causes the wire to form a helix of smaller diameter, and a more obtuse angle between the wire and the edge makes for larger diameters. A variation in the tension may be effected by increasing the frictional resistance of the tension device, and such increase may be temporary or recurrent, in the latter case being effected by a power-driven cam (not shown) or similar mechanism. A variation in the angle may be effected by manual adjustment of the angle of the arm carrying the edge or by a power-driven cam (not shown) arranged to swing the arm to effect a change in the angle. In the case of steel wire, a spring coiling machine of a well-known type may be used to turn out helices of the desired pitch and diameter. Some of the different helices which may be formed by the variations or adjustments described above are shown diagrammatically in Figs. 13 to 17 inclusive.

Figure 13:
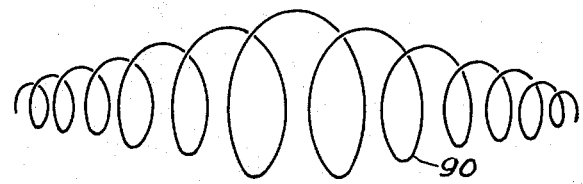
Figs. 13–17 are diagrammatic elevations of different helices which may be formed as cores for filler elements of the invention.
Figure 14:
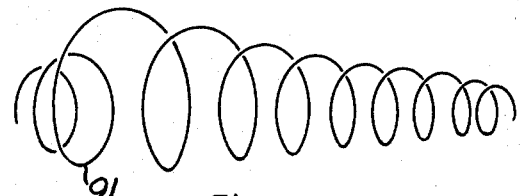
Figure 15:
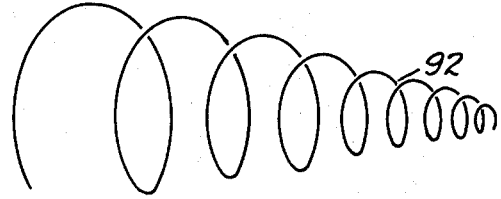
Figure 16:
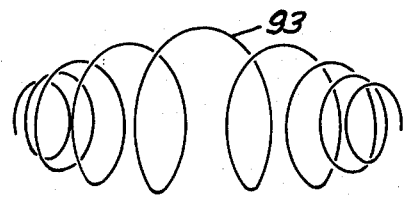
Figure 17:
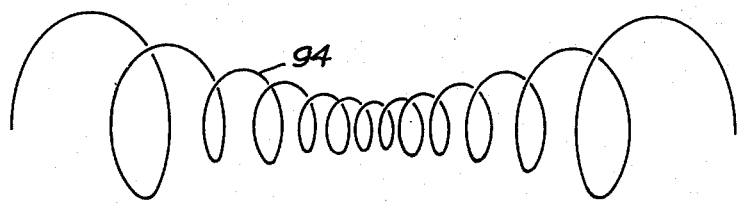

Fig. 13 shows a helix 90 having its greatest diameter at its middle and tapering off uniformly toward each end to a smaller diameter. Fig. 14 shows a helix 91 having both ends small, but with a non-uniform increase in diameter toward its middle portion. In Fig. 15 the helix 92 tapers uniformly from one end to the other. Fig. 16 shows a helix 93 having close coils near its ends and open coils at its middle portion. In Fig. 17 the helix 94 has both ends large and open, and its middle portion made of coils which are of small diameter and closer together. All the helices of Figs. 13–17 may be of metallic wire or of plastic monofilaments. Several alternations of close and open coils may be provided in each helix length so that the resistance to lateral compression may be proportioned to the load likely to be imposed. Thus, a human body inside a sleeping bag lying flat on the back presses heaviest below the shoulder blades, under the buttocks and thighs, and under the heels. The feather-covered helices of the invention may be made and assembled to withstand the variable and unequal loads imposed by the weight of the human body, which sometimes equal 4 p. s. i.

To increase the filling power of chicken feathers, and to make the feathers more receptive to subsequent finishing operations, many experiments have been conducted. Commercial "curled" feathers and feather fibers come on the market washed but they still contain a natural oil or wax or similar constituent which tends to make the feathers pack and materially reduces their filling power. It has been discovered that if these washed feathers or fibers are treated with a solvent, such as $CCl_4$, $C_6H_6$ or $C_2H_5OH$, their filling power will increase as much as 30 to 35%, which is indeed surprising. Standard perchlorethylene dry cleaning solution is also useful for extracting the oil from straight or crushed chicken feathers. The first extraction reduces the oily content to about 0.6% by weight; a second extraction may reduce this content to about 0.2%; but surprisingly enough, the filling power of the product after the second extraction is lessened, hence a second extraction is usually undesirable. In figures, the first extraction, using either commercial dry cleaning solution or carbon tetrachloride or alcohol wash results in a product having a filling power of 3.3 to 4.1 cm., whereas after the second extraction the product will have a filling power of only 2.9 to 3.3; all of which suggests that mild solvent washing removes the more soluble oils while more complete extraction removes additionally at least part of the less soluble hard natural wax. The removal of the oily ingredient reduces the weight of the final feather product by about 2%, besides yielding a by-product which may be assumed to have commercial value, for instance, to supplement chicken feed. The extraction of this oil is also desirable to remove an odoriferous component which makes chicken feathers unpleasant. Betters results are always obtained by extracting the oil after washing the feathers.

As a further step, the washed and solvent-treated feathers are sprayed or tumbled or run through a bath of a wax, a resin, or an elastomer. This coating step may be performed either before or after feather-attachment, but at the present I prefer that the additive feathers be treated prior to attachment. Following coating, the feathers are dried and/or cured by air currents and/or heat and are fluffed by aeration and mechanical means to make the barbs stand out, whereupon the electrostatic capacity of the feathers will be at a maximum. Such steps will increase the filling power by 100% or even more.

Still another step, which is desirable both to increase the filling power of the final product and to enhance its softness, is the removal of the quills from the feathers prior to affixing them to the core, resulting in an increase in filling power of as much as 50%. The quill-removing process, said to have been developed at the University of Delaware, involves passing chicken feathers through a hammer mill, and if necessary drying them so that the quills can be separated from the barbs in an air column. The end product, so-called "feather fibers," may be coated with a resin, an elastomer, or a wax, preferably before being secured by an adhesive to the core in the manner previously described.

A large number of measurements of the filling power of chicken feathers, straight, crushed and otherwise treated, have been performed, a few of which are summarized in Table II.

TABLE II

*Showing effect of sustaining form on filling power of crushed and treated chicken feathers*

| Run Symbol | Feathers on Sustaining Form | Filling Power (cm.) |
|---|---|---|
| H-32a | Yes | 6.0 |
| H-63 | No | 2.8 |
| H-68 | No | 2.4 |
| H-71 | Yes | 5.1 |
| K-6a | No | 3.7 |
| K-6b | Yes | 4.6 |
| K-12a | No | 4.2 |
| K-12b | Yes | 5.0 |
| K-13a | No | 4.1 |
| K-13b | Yes | 5.1 |
| K-50 | No | 2.9 |
| K-67d | Yes | 4.9 |
| K-92a | No | 2.6 |
| K-92b | Yes | 4.0 |
| K-94a | No | 2.8 |
| K-94b | Yes | 5.2 |
| K-98c | No | 3.9 |
| K-98d | Yes | 5.1 |
| L-65-2 | No | 3.8 |
| L-65-3 | Yes | 5.2 |
| L-76-2 | No | 3.9 |
| L-76-3 | Yes | 5.6 |
| L-81-1 | No | 4.1 |
| L-81-2 | Yes | 6.0 |

All the above experiments were performed in the laboratory at the Mellon Institute of Industrial Research, Pittsburgh, Pennsylvania.

The filling power values of the above table are based on test pressures of 0.0021 p. s. i. and are expressed in centimeters. For comparison, straight uncoated chicken feathers have a filling power of about 2 cm.; commercial (crushed) feathers have a filling power of 2.8 to approximately 3 cm. The filling power of the 40–60 waterfowl down-feather mixture now being purchased by the U. S. Army for use in sleeping bags varies between 5.5 and 5.8. It should be emphasized, however, that the standard filling power test does not give a fair evaluation of the insulating characteristics of the fillers produced by the inventive processes.

The filler elements, being of indefinite or unlimited lengths, may be woven to form high bulk layers and lofty fabrics useful for heat insulation. Such bulky fabrics will be characterized by their outstanding stability due to the anchoring of the individual feathers and the core material; there will be no voids due to piling up or bunching of loose material in pockets such as occurs with many quilted fabrics of the prior art.

I am aware that it has been proposed to apply flock to straight wires and other resilient cores for the purpose of electrically insulating such cores; also that rayon flock has been attached to automobile seat cushion springs by an adhesive to deaden the sound emitted by such springs under shifting loads. Flock is usually 1 mm. or less in length and is too fine to provide the substantial heat-insulating layer which feathers, feather-fibers or the like will provide.

What I claim is:

1. A method of making an elongated filler adapted to sustain loads imposed laterally thereon including the steps of treating a relatively fine, resilient, tensioned core member so that it will have an unbalanced internally tensioned state whereby, upon release of tension external to it, it will assume and normally maintain a generally helical shape; causing the treated tensioned core member to travel; coating the treated core member during its travel and while under external tension with a tacky adhesive; conveying feathers into forcible contact with the coated traveling core member before the adhesive dries so that feathers will adhere tenaciously to the core member and cover the same with a substantial bulky layer over substantially the entire length thereof; and finally relaxing the external tension on the core member so that it assumes a generally spiral form with the feathers extending out from the core member in all directions.

2. The invention defined in claim 1, wherein the adhesive is a butadiene-acrylonitrile rubber type adhesive having the following properties: forming a bond stronger than the feathers themselves, protecting a corrodible core member against corrosion, being vulcanizable, and withstanding ambient temperatures in the range of $+120°$ F. to $-65°$ F.

3. The invention defined in claim 1, wherein most of the feathers have quills and are conveyed to the coated core member by a confined air current having a volume and velocity controlled so that the feathers are orientated with their quills presented foremost so that the quills usually strike the core member and become attached thereto by the adhesive.

4. A method of making an elongated filler element adapted to sustain loads imposed laterally thereon including the steps of treating a relatively fine, resilient, tensioned core member so that the core member will have an unbalanced internally tensioned state so that upon release of external tension, it will assume a generally helical form; causing the treated core member to travel; coating the treated core member while traveling under external tension and extending substantially straight with a tacky adhesive; conveying feathers to the coated core member while the core member is still under external tension and traveling, and causing the conveyed feathers to adhere to the coated core member throughout substantially its entire length; and relieving the feather-covered core member of external tension so that it becomes a helix covered with a bulky layer of tenaciously adherent feathers.

5. The invention defined in claim 4, wherein the feathers are blown by a stream of air, the method being further characterized by a circulation in a confined space of any of the feathers which move past the coated core without becoming attached thereto, such circulation continuing indefinitely until the traveling core is substantially completely covered with feathers.

6. The invention defined in claim 5, wherein the feathers are carried upwardly by the stream of air against the traveling coated core in said confined space and those feathers which do not then become attached are caused to move above and generally parallel to the traveling coated core and then are carried downwardly by the stream of air against the traveling coated core, and those feathers which are still unattached continue the described circulatory movement indefinitely until they are attached at some point along the traveling coated core.

7. A method of making an elongated filler element adapted to sustain loads imposed laterally thereon including the steps of treating a relatively fine, resilient, tensioned core member so that the core member will have an unbalanced internally tensioned state so that upon release of external tension, it will assume a generally helical form; causing the treated core member to travel; coating the treated traveling core member with a tacky adhesive; relieving the core member of external tension while it is still traveling; and conveying feathers into contact with the still traveling but substantially untensioned coated core member so that feathers will adhere to the general helical core member throughout substantially the entire length thereof.

8. The invention defined in claim 7, wherein the adhesive is a butadiene-acrylonitrile rubber type vulcanizable adhesive capable of forming a bond stronger than the feathers themselves and withstanding ambient temperatures in the range of $+120°$ F. to $-65°$ F.

9. The invention defined in claim 7, wherein some feathers are conveyed to the underside of the coated core member when relaxed and having a generally open helical form, some of said feathers becoming attached to adjacent coils of the helix to extend generally lengthwise of the helix, and simultaneously conveying other feathers to the coated core member by means of a confined air current which is of sufficient force to cause said other feathers to strike and become attached to the core member on the inside as well as outside of the helix.

10. A method of making an elongated filler element adapted to sustain loads imposed laterally thereon including the steps of spiralizing a fine wire-like member; coating the wire-like member with a tacky adhesive; conveying a fibrous light-weight bulky material to the immediate vicinity of the coated wire-like member to cause it to adhere to the coating in such quantities as will result in the wire-like member being covered with a bulky fibrous layer, the spiralized wire-like member upon assuming its inherent generally helical form having the fibrous material tenaciously adhered thereto and sticking out therefrom substantially in all directions.

11. The invention defined in claim 10, wherein the fibrous material is bird feathers washed and treated with an oil-extracting solvent and dried.

12. The invention defined in claim 11, characterized by the further step of coating the bird feathers before such conveyance with a material having the ability to adhere to the feathers and to enhance substantially the filling power of the final product.

13. The invention defined in claim 10, wherein the fibrous material is crushed chicken feathers washed and dried.

14. The invention defined in claim 13, characterized by the further step of coating the feathers before such conveyance with a material having the ability to adhere to the feathers and to enhance substantially the filling power of the final product.

15. A filler element suitable for heat-insulating sleeping bags, pillows, comforters and the like comprising, in combination, an open helical core made of a fine resilient wire-like material which is yieldable to lateral compression, and a mass of feathers firmly secured by an adhesive to the helical core and substantially completely hiding the same and forming a layer of substantial bulk, the diameter and pitch of the helical core being of substantial dimensions.

16. A filler element suitable for heat-insulating sleeping bags, pillows, comforters and the like comprising, in combination, an open helical core made of a fine resilient wire-like material which is yieldable to lateral compression, and a multiplicity of feathers firmly secured to the helical core and substantially completely hiding the same and forming a layer of substantial bulk, the diameter and pitch of the helical core being of substantial dimensions, and the feathers being predominantly secured to the helical core by attachment of their quills by means of an adhesive.

17. A filler element suitable for heat-insulating sleeping bags, pillows, comforters and the like comprising, in combination, an open helical core made of a fine resilient wire-like material which is yieldable to lateral compression, and a multiplicity of feathers which are deprived of their quills secured to the core by means of an adhesive, said feathers substantially completely hiding the core and forming a layer of substantial bulk, the diameter and pitch of the helical core being of substantial dimensions.

18. A filler element suitable for heat-insulating sleeping bags, pillows, comforters and the like comprising, in combination, an open helical core made of a fine resilient steel wire which is yieldable to lateral compression, and a multiplicity of chicken feathers secured to the wire so as to substantially completely hide the same, said feathers forming a layer of substantial bulk, and an adhesive holding the feathers individually upon the core, said adhesive being of such a character that it completely coats the wire core to inhibit rust and forms a bond which is stronger than the feathers themselves.

19. A filler element suitable for heat-insulating sleeping bags, pillows, comforters and the like comprising, in combination, an open helical core made of a fine resilient steel wire which is yieldable to lateral compression, and a multiplicity of chicken feathers secured by an adhesive to the wire core, said adhesive being a butadiene-acrylonitrile rubber type adhesive and completely covering the steel wire, said feathers forming a layer of substantial bulk and substantially completely hiding the wire core.

20. A filler element suitable for heat-insulating sleeping bags, pillows, comforters and the like comprising, in combination, an open helical core made of a fine resilient wire-like material which is yieldable to lateral compression, the diameter and pitch of the helical core being of substantial dimensions; a multiplicity of feathers firmly secured to the helical core and substantially completely hiding the same and forming a layer of substantial bulk; and a fabric tube inclosing the feather-covered helical core, the internal dimensions of the fabric tube approximating the external or over-all dimensions of the covered helical core when subjected neither to tension nor to compression; the fabric tube having a seam on its outside extending its entire length and having its walls held against collapsing by the helical core within it.

21. A filler element suitable for heat-insulating sleeping bags, pillows, comforters and the like comprising, in combination, an open helical core made of a fine resilient wire-like material which is yieldable to lateral compression, the diameter and pitch of the helical core being of substantial dimensions; a multiplicity of feathers firmly secured to the helical core and substantially completely hiding the same and forming a layer of substantial bulk; and a fabric tube inclosing the feather-covered helical core, the internal dimensions of the fabric tube approximating the external or over-all dimensions of the covered helical core when subjected neither to tension nor to compression; the fabric tube having a stitched seam on its outside extending its entire length and having its walls held against collapsing by the helical core within it, some of the feathers of the covered core extending into the seam and being secured thereto by the stitching thereby to hold the feather-covered core against substantial movement longitudinally of the tube.

22. As a new article of manufacture, a filler element consisting of an open helical core having two ends and made of a fine resilient material which is yieldable to lateral compression, and a mass of feathers adhesively bonded to the core to substantially completely cover the same and form a layer of substantial bulk, the diameter of the core at points between its ends being substantially different from the diameter at the two ends of the filler element so that the filler element will without collapsing sustain substantially different radially imposed compressive loads at different points along its length.

23. The invention defined in claim 22, wherein the core is of greatest diameter at a point between its two ends and is of least diameter at its ends.

24. The invention defined in claim 22, wherein the core is of greatest diameter at one end and of least diameter at the opposite end and tapers uniformly from one end to the other.

25. The invention defined in claim 22, wherein the core is of greatest diameter at its middle, where the coils are well separated, and is of least diameter at each end, where the coils are close together.

26. The invention defined in claim 22, wherein the core is of greatest diameter at its two ends and is of least diameter at its middle, the coils at its ends being open or well separated and the coils at and near its middle being close together.

27. In combination, a textile fabric sheet, and a plurality of fabric tubes secured to at least one face of the sheet sufficiently close together to provide a substantially continuous layer, each of the fabric tubes comprising a piece of textile having a resilient open helical core covered with adhering feathers and fitting inside the fabric tube and holding the walls of said tube against collapsing under ordinary handling but yieldable to lateral compression; the fabric tubes each having sewn seams, and stitching uniting said seams with the fabric sheet.

28. In combination, a textile fabric sheet, and a plurality of fabric tubes each having a sewn seam projecting outwardly therefrom to provide a fin, stitching passing through each fin to unite each tube to the fabric sheet, each tube being free of any means of attachment to the fabric sheet except said stitched fin so that the tube may swing relative to the fabric sheet to which it is secured; and tubes being sufficiently close together to provide a substantially continuous layer; each fabric tube comprising a piece of textile having a resilient open helical core covered with feathers adhering thereto, said covered core fitting inside the fabric tube and holding its walls against collapsing under ordinary handling but yieldable to lateral compression.

29. A fabric for garments and the like comprising an inner layer of textile material, an outer layer also of textile material, and an insulating layer between said inner and outer layers composed principally of a plurality of helical cores each consisting of a fine wire-like material adapted to yield to lateral compressive stresses, and a multiplicity of feathers individually and firmly secured to each helical core and substantially completely covering the same with a bulky layer of soft heat-insulating material.

30. A fabric for garments and the like comprising an inner layer of textile material, an outer layer also of textile material, and an insulating layer between said inner and outer textile layers; said insulating layer consisting of a plurality of helical cores each stitched to one of said textile layers so as to be substantially immovable; each helical core consisting of a fine resilient wire-like core adapted to yield to lateral compressive stresses, and a multiplicity of feathers bonded to each helical core and substantially completely covering the same with a bulky layer of soft heat-insulating material.

References Cited in the file of this patent

UNITED STATES PATENTS

| | | |
|---|---|---|
| 118,668 | Adamson | Sept. 5, 1871 |
| 771,999 | Potter | Oct. 11, 1904 |
| 1,270,841 | Kelly | July 2, 1918 |
| 1,345,046 | Wedlock | June 29, 1920 |
| 1,392,287 | Wever | Sept. 27, 1921 |
| 1,895,711 | Foley | Jan. 31, 1933 |
| 2,115,079 | Lilley et al. | Apr. 26, 1938 |
| 2,146,314 | Radford | Feb. 7, 1939 |
| 2,155,647 | Frenkel | Apr. 25, 1939 |
| 2,162,778 | Kent | June 20, 1939 |
| 2,518,487 | Metz | Aug. 15, 1950 |
| 2,590,713 | Libbey | Mar. 25, 1952 |
| 2,596,457 | Wulff | May 13, 1952 |
| 2,604,318 | Jacobs | July 22, 1952 |
| 2,620,493 | Brelsford | Dec. 9, 1952 |